United States Patent Office 2,744,095
Patented May 1, 1956

2,744,095

LINEAR POLYESTERS FROM p,p'-SULFONYL DIBENZOIC ACID CONDENSED WITH AN ALIPHATIC ETHER GLYCOL

John R. Caldwell, Kingsport, Tenn., assignor to Eastman Kodak Company, Rochester, N. Y., a corporation of New Jersey No Drawing. Application October 3, 1952,
Serial No. 313,067

19 Claims. (Cl. 260—75)

This application relates to valuable linear polyesters prepared by condensing a p,p'-sulfonyl dibenzoic diester with an aliphatic ether glycol which may include some polymethylene glycol.

It is an object of this invention to provide novel polyesters as described herein. It is another object to provide a process as described herein for preparing valuable linear polyesters. Other objects will become apparent hereinafter.

This application is a continuation-in-part of my copending application, Serial No. 143,594, filed February 10, 1950, now United States Patent No. 2,614,120 dated October 14, 1952. In that application sulfonyl dibenzoic acid is called bis (dicarboxy diphenyl sulfone).

Highly polymeric esters of terephthalic acid and various glycols are well known and have been used in the preparation of linear, highly polymeric polyesters having properties including that of being capable of being formed into useful filaments, fibers and the like, and having high melting points and a low degree of solubility in organic solvents.

Polyesters based on terephthalic acid condensed with aliphatic ether glycols of the type described below cannot be prepared so as to produce high melting polyesters which are of excellent utility as fibers, photographic film base, etc., inasmuch as the melting point of such terephthalic polyesters would be on the order of about 120° C. Moreover, the terephthalic polyesters described in the prior art do not possess the herein described highly advantageous properties which render them suitable for processing into shaped objects, e. g. film, tubes, etc.

It has now been found that p,p'-sulfonyl dibenzoic acid or its esters or its acid chloride can be condensed with an aliphatic ether glycol to produce a new kind of linear polyester having highly valuable properties which are superior to those of the linear polyesters described in the prior art. Thus, my new linear polyesters can be prepared having a softening point above 200° C. and fibers, films, etc. of exceptional properties at high temperatures can be prepared from these new polyesters. These fibers, films, etc. have exceptionally high tensile strength and elasticity. The fibers have softening points well above 160° C. (often above 200° C.) and show excellent resistance in most organic solvents even at elevated temperatures. My new polyesters can be extruded in the form of films or sheets which are especially valuable as photographic film base material because of their excellent dimensional stability and resistance to swelling by water.

These novel linear polyesters can be prepared employing mixtures of glycols which contain at least 30 mole percent (preferably 50 to 100 mole percent) of an aliphatic ether glycol or a mixture of such ether glycols with the balance of the glycol mixture being made up of polymethylene glycols.

My novel polyesters may contain as constituents thereof small percentages of m,m' and/or m,p' isomers of the p,p'-sulfonyl dibenzoic compound without significant deleterious effect on the properties of the polyesters.

These new polyesters can be processed to form fibers by melt spinning methods which have many advantages over the methods required for preparing other fibers such as the acrylonitrile fibers which have recently been commercially developed as fibers, yarns and textile fabrics. Acrylonitrile fibers have to be prepared from solutions necessitating dope preparation and solvent recovery, both of which operations are unnecessary in melt spinning methods. Moreover, melt spinning makes possible the more rapid spinning of fibers since no solvent is present.

The polyesters of my invention employing aliphatic ether glycols can be prepared having a relatively wide softening range and good flow characteristics whereby they are quite valuable for the preparation of shaped objects by molding or extrusion methods. The softening range and flow characteristics are improved by employing mixtures of aliphatic ether glycols with other aliphatic ether glycols or polymethylene glycols. These novel linear polyesters can be prepared so as to soften at temperatures which are above 180°–200° C. Useful linear polyesters can also be prepared which soften at somewhat lower temperatures. The polyesters having melting or softening temperatures in the lower part of the overall range applicable to these polyesters are useful in the manufacture of electrical insulation, gaskets, packing, flexible tubing, rods, sheets, etc.

When the isomers of p,p'-sulfonyl dibenzoic acid diesters are employed in admixture with the p,p'-isomer, the linear polyester product has a lower melting point and softening temperature. This same effect is produced when homologs of the p,p'-isomer and the other isomers are incorporated into the linear polyester. If homologs are employed they are most advantageously those of the p,p'-isomer, e. g. m,m' dimethyl,-p,p'-sulfonyl dibenzoic acid, o-ethyl-p,p'-sulfonyl dibenzoic acid, m-methyl-o-propyl-p,p'-sulfonyl dibenzoic acid, etc. Small proportions of the various diesters of such isomers and homologs can be employed in substitution for a corresponding quantity of p,p'-sulfonyl dibenzoic acid diester when the linear polyester product is not intended to be used in the preparation of fibers. In fact, when the polyester is to be employed for purposes other than making fibers, substantial quantities of these isomers and homologs can be employed if an exceptionally high melting point (e. g. over 200° C.) is not necessarily desired but a wide softening temperature range is deemed advantageous.

Two of the outstanding qualities of the polyesters of this invention are their excellent dimensional stability and low degree of water absorptivity. This results in superior resistance to dimensional change despite changes in atmospheric humidity or immersion in aqueous solutions. These qualities result in this linear polyester being well suited to the manufacture of photographic film base.

One embodiment of my invention relates to a process for preparing a linear polyester which comprises (A) condensing a p,p'-sulfonyl dibenzoic diester having the formula:

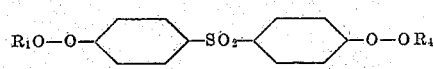

wherein $R_1$ and $R_4$ each represents a substituent selected from the group consisting of an omega-hydroxy alkyl radical containing from 3 to 12 carbon atoms and an alkyl radical containing from 1 to 6 carbon atoms, (B) with a dioxy compound consisting of from about 30 to 100 mole percent of an aliphatic ether glycol having the following formula:

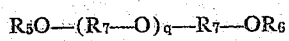

wherein $R_7$ represents an alkylene radical containing from 2 to 4 carbon atoms, $q$ represents a positive integer of from 1 to 10, and $R_5$ and $R_6$ each represents a substituent selected from the group consisting of hydrogen atom and an acyl radical containing from 2 to 4 carbon atoms, and from about 70 to 0 mole percent of a polymethylene glycol having the following formula:

$$R_5O—(CH_2)_p—OR_6$$

wherein $p$ represents a positive integer of from 2 to 12, the dioxy compound being employed in such a proportion that there is at least an equivalent amount of oxy substituents in proportion to the carboxy substituents in the overall combination of the diester and the dioxy compounds, (C) in the presence of a condensing agent selected from the group consisting of the alkali metals, the alkaline earth metals, the oxides of these two groups of metals, the alkoxides containing from 1 to 8 carbon atoms of these two groups of metals, the carbonates and borates of these two groups of metals, lead oxide (litharge), and compounds having the following formulas:

$M(Al(OR)_4)$,
$M(HZr(OR)_6)$, $M'(HZr(OR)_6)_2$,
$MH(Ti(OR)_6)$, $M_2(Ti(OR)_6)$,
$M'(HTi(OR)_6)_2$, $M'(Ti(OR)_6)$,
$(RR'R''R''')_2(Ti(OR)_6)$,
$(RR'R''R''')H(Ti(OR)_6)$,
$Ti(OR)_4$, $PbR_4$ and
$RMgHal$ wherein M represents an alkali metal, M' represents an alkaline earth metal selected from the group consisting of magnesium, calcium and strontium, R represents an alkyl group containing from 1 to 6 carbon atoms, R', R" and R''' each represents a member of the group consisting of R and an aryl group of the benzene series containing from 6 to 9 carbon atoms and Hal represents a halogen atom, (D) at an elevated temperature, (E) the condensation being conducted in an inert atmosphere, and (F) the latter part of the condensation being conducted at a very low pressure of the inert atmosphere.

The dioxy compound (or compounds) is advantageously employed in such a proportion that there are from about 1.2 to about 3 oxy substituents in proportion to the carboxy substituents in the overall combination of the dibenzoic compound and the dioxy compound. Advantageously, the elevated temperature employed during the earlier part of the condensation is from about 150° C. to about 220° C. However, higher and lower temperatures can also be employed. The upper temperature depends upon the boiling point of the dioxy compound (glycol or glycols) employed. Advantageously, the low pressure defined under (F) is less than about 15 mm. of Hg pressure. Most advantageously the pressure is less than about 5 mm. of Hg pressure. Most advantageously the dioxy compounds are aliphatic ether glycols and polymethylene glycols having the formulas depicted above wherein $R_5$ and $R_6$ represent hydrogen atoms. Most advantageously the aliphatic ether glycol is used to the extent of 50 mole percent or more of the combined dioxy compounds employed.

The dioxy compounds defined above may not actually contain any free hydroxy radicals since they may be in esterified form as indicated by the formulas given. However, these hydroxy or substituted hydroxy radicals are referred to generically as oxy radicals or substituents. The dioxy compounds which can be employed in accordance with this invention are most advantageously dihydroxy compounds; such compounds will hereinafter be referred to as dihydroxy compounds although it is to be understood that dioxy compounds of the type described above are intended to be covered by this term. Similarly, the sulfonyl dibenzoic compounds defined above do not actually contain any free carboxy radicals since $R_1$ and $R_4$ are omega hydroxyalkyl or alkyl radicals; however, these $CO—OR_1$ and $CO—OR_4$ radicals are generically referred to as carboxy radicals in the description of the above process.

Furthermore, this invention covers processes as defined above wherein the sulfonyl dibenzoic compound is an omega-hydroxy-aliphatic diester which is formed by a preliminary step comprising condensing p,p'-sulfonyl dibenzoic acid with a dihydroxy compound which is defined under (B) and is employed in the proportions set forth under (B), at an elevated temperature, after which preliminary step the condensing agent which is defined under (C) is added and the condensation is completed as defined under (D), (E) and (F). Advantageously, the elevated temperature employed during the preliminary step is substantially that at which reflux conditions subsist; however, higher and lower temperatures can also be employed. Advantageously, as indicated above the polyhydroxy compound is employed in such a proportion that there are from about 1.2 to about 3 hydroxy substituents in proportion to the carboxy substituents in the overall combination of the sulfonyl dibenzoic acid and the dihydroxy compound.

Linear highly polymeric polyesters can be prepared as described above from the free acidic p,p'-sulfonyl dibenzoic acid, or much more advantageously from its diesters by condensation with dihydroxy compounds. These linear polyesters have very high melting or softening points, i. e., about 180° C.–200° C. or higher and are valuable in the manufacture of sheets, films, coatings, fibers, threads, filaments, molding plastics, etc. Linear polyesters can also be prepared employing two or more of either of the types of glycols defined above.

The polyesters produced in accordance with this invention can be prepared which incorporate polymethylene glycols having shorter chains than is possible when no aliphatic ether glycol is present. The preparation of very high melting linear polyesters containing only polymethylene glycols is described in my co-pending application filed on even date herewith, Serial No. 313,061.

The products of this invention are linear polyesters having melting points on the order of 180–200° C. (generally at least 160° C.) which are below the decomposition temperature of the polyester, which polyesters contain the following repeating unit:

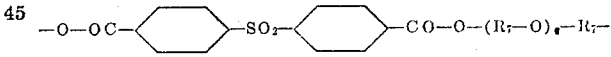

wherein $R_7$ and $q$ are defined above. As indicated hereinbefore, these polyesters can also contain up to 70 mole percent of the following repeating unit:

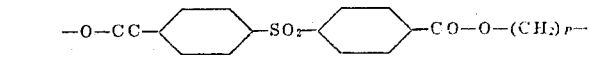

wherein $p$ is defined above. These polyesters are capable of being formed into fibers (such as by melt spinning methods) especially when $R_7$ represents an ethylene radical, $q$ is 1, $p$ is a positive integer, $s$, of from 2 to 8, and the mole percent of the last depicted repeating unit is from 30 to 70 which is in converse relation to the mole percent of the first depicted repeating unit which is present to the extent of from 70 to 30 mole percent; these fibers can be drawn by conventional means to from about 3 to 6 times their originally spun length whereby these fibers develop strong, elastic and highly valuable properties. Valuable fibers can also be prepared employing smaller proportions (less than 30 mole percent) of the last depicted repeating unit when $s$ (or $p$) is a low number, e. g., 2 or 3. Moreover, fibers can be prepared when the sole glycol employed is diethylene glycol; however, such fibers have lower melting and softening temperatures than those described containing a short chain polymethylene glycol.

Examples of the aliphatic ether glycols which can be employed advantageously in accordance with this invention include diethylene glycol, triethylene glycol, tetraethylene glycol, bis (4-hydroxybutyl) ether, and bis (3-hydroxypropyl) ether; thus, $q$ in the formula set forth above is advantageously from 1 to 4, (most advantageously $q$ is 1). Other suitable aliphatic ether glycols having the following formulas can be employed in addition to those mentioned above.

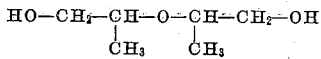

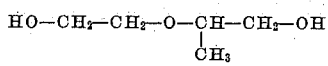

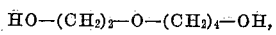

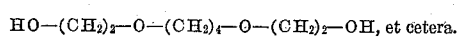

The ether linkages can be separated by branched chain alkyl radicals as indicated in the above formulas; however, higher melting polyesters are produced when the various atoms in the aliphatic ether glycol constitute a straight chain. When branched chain aliphatic ether glycols are employed, it is advantageous to combine such a glycol with a substantial proportion of polymethylene glycol in order to enhance the melting and softening temperatures of the polyester product. As indicated above, mono or diesters of these aliphatic ether glycols can also be employed. Thus, the acetates, propionates and butyrates are examples of such esters. Mixtures of 2 or more of these aliphatic ether glycols can also be employed.

Examples of the polymethylene glycols which can be employed in conjunction with the aliphatic ether glycols in accordance with this process of this invention include ethylene, trimethylene, pentamethylene, decamethylene, and other such glycols. As indicated above, mono or diesters of these glycols can also be employed. Thus, the acetates, propionates and butyrates are examples of such esters. Mixtures of two or more of these polymethylene glycols can also be employed in conjunction with one or more of the aliphatic ether glycols. Generally, the more components there are in the dihydroxy composition, the greater will be the tendency toward producing a lower melting polyester product; accordingly, it is generally most advantageous to employ no more than one aliphatic ether glycol and only one polymethylene glycol in preparing any given polyester.

The catalytic condensing agents which can be employed have been described above. From about 0.005% to about 0.2% of these catalysts based on the weight of the reactants being condensed can be employed. Higher or lower percentages can also be employed. Generally, from about 0.01 to about 0.06% of the catalytic condensing agent can be advantageously employed based on the weight of the sulfonyl dibenzoic diester being condensed.

The temperature at which polyesterification can be conducted is dependent upon the specific reactants involved in any given reaction. In general, the reaction mixture can be heated at from about 150° to about 220° C. for from approximately two to three hours in an inert atmosphere (e. g. nitrogen or hydrogen); the mixture can then be heated at from about 225°–240° to about 280°–310° C. in the same atmosphere for approximately one to two hours. Finally, the pressure can be greatly reduced to form a vacuum (less than about 15 mm. of Hg pressure but preferably on the order of less than 5 mm. of Hg pressure) while the temperature is maintained in the same range (225°–310° C.); these conditions are advantageously maintained for approximately four to six additional hours. The conditions can be varied considerably depending upon the degree of polyesterification desired, the ultimate properties sought, the stability of the polyester being produced and the use for which the product is intended.

The sulfonyl dibenzoic compound employed can be used in the form of its alkyl diesters e. g. methyl, ethyl, propyl, isopropyl, butyl, etc. esters. It can also be used in the form of a partial glycol ester (omega-hydroxyaliphatic diester) which can be obtained by heating the acid with an excess of a dihydroxy compound of the types described above.

The reaction can be carried out in the presence or absence of a solvent. Inert, high boiling compounds, such as diphenyl ether, diphenyl, mixed tolyl sulfones, chlorinated naphthalene, chlorinated diphenyl, dimethyl sulfolane, etc. can be used as the reaction medium.

It has been found that the type of catalyst used has an important bearing upon the properties of the final product. Although most of the catalysts cited in the prior art can be used, it has been found that certain novel catalysts give superior results. The aluminum and titanium alkoxide complexes described in copending applications filed on even date herewith are especially valuable for the preparation of the polyesters described here. Moreover, novel tin catalysts have also been found to be especially effective. See Caldwell Serial No. 313,072, Serial No. 313,078, Caldwell & Reynolds Serial No. 313,077, Wellman & Caldwell Serial No. 313,074, Serial No. 313,075 and Serial No. 313,076, and Wellman Serial No. 313,073 for a description of especially advantageous catalytic condensing agents.

It is important to exclude oxygen and moisture at all stages of the condensation reaction. Inert atmospheres which can be advantageously employed include nitrogen, hydrogen, helium, etc. During the process good agitation is provided. Substantially anhydrous reactants can be advantageously employed although this is not essential especially if any water is removed in the earlier stages of the condensation.

The acid chloride of sulfonyl dibenzoic acid can also be employed, i. e., when $OR_1$ and $OR_4$ each represents a Cl atom. When the acid chloride of sulfonyl dibenzoic acid is used, best results are generally obtained by employing an exactly equivalent amount of glycol in the absence of a catalytic condensing agent. The initial temperature to start the condensation can be about 100° C.

In the examples given below, the hot bar sticking temperature is referred to in several instances. The hot bar sticking test can be briefly described as follows: The polyester fiber is placed on the flat surface of a heated bar and a weight of 100 g. is applied to the fiber along a distance of ⅝ inch of the fiber length. The contact surface of this weight has a coating of polytetrafluoroethylene which acts as a thermal insulator. The fiber is allowed to remain in contact with the bar under this weight for one minute. The minimum temperature at which the fiber adheres to the hot bar under these conditions is the sticking temperature as that term is employed in the examples given therein.

This invention can be further illustrated by the following examples; in addition to these examples it is apparent that other variations and modifications thereof can be adapted to obtain similar results.

*Example 1.—Diethylene glycol*

Four hundred and twenty g. (1.0 mol) of p,p'-sulfonyl-dibenzoic acid dibutyl ester and 180 g. (1.7 mol) diethylene glycol were placed in a reaction vessel equipped with a stirrer, short distillation column, and inlet for purified hydrogen. A piece of magnesium ribbon, weighing about 0.1 g. was heated in iodine vapors to activate the surface and added to the reaction mixture. The mixture was stirred at 200–210° C. under an atmosphere of purified hydrogen until 80–90 percent of the butyl alcohol had distilled off. The temperature was then raised to 250° C. and held for one hour. A vacuum of 1.0 to 2.0 mm. of Hg pressure was applied, and heating and stirring were continued for 8 to 10 hours. The product obtained has an inherent viscosity of 0.6 to 0.7 in a mixture of 60% phenol–40% tetrachlorethane. The crystalline form of the polyester melts at 200–210° C. When extruded in the form of filaments and drafted, it sticks to the hot bar at 170–180°. The polymer is soluble in γ-butyrolactone, ethylene carbonate, and dimethyl sulfolane at 100–150° C. It precipitates when the solutions are cooled to room temperature. The polyester is particularly suitable for the manufacture of photographic film base. It gives high-strength films that show excellent dimensional stability and very low water absorption. The films can be prepared by melt extrusion methods. The polyester can also be used for electrical insulation on wires and in condensers. It can be extruded in the form of sheets, tubes, rods, etc.

*Example 2.—Bis (4-hydroxybutyl) ether*

Three hundred and seventy-two g. (1.0 mol) p,p'-sulfonyl-dibenzoic acid diethyl ester and 250 g. (1.5 mol) bis (4-hydroxybutyl) ether were placed in a reaction vessel equipped with a stirrer, an inlet for purified nitrogen, and a short distillation column. A solution of 0.3 g. methyl magnesium iodide in 10 cc. ethyl ether was added as a catalyst. The reaction mixture was stirred at 200–210° C. until 80–90% of the ethyl alcohol had distilled off. An atmosphere of purified nitrogen was maintained in the vessel. The temperature was then raised to 240–250° C. and held for 1.5 to 2 hours. A vacuum of 2 to 3 mm. of Hg pressure was applied and the melt stirred for 8 hours. The polymer obtained softens at 160–170° C. It can be extruded in the form of sheets, rods, tubes, etc. It can be molded by injection and compression methods.

*Example 3.—Diethylene glycol and pentamethylene glycol*

Four hundred and twenty g. (1.0 mol) of p,p'-sulfonyldibenzoic acid dibutyl ester, 106 g. (1.0 mol) diethylene glycol, and 104 g. (1.0 mol) pentamethylene glycol were placed in a reaction vessel as described in Example 1. A solution of 0.4 g. sodium titanium butoxide in butyl alcohol was added as a catalyst. The mixture was stirred at 200–220° C. in pure nitrogen until about 80% of the butyl alcohol had distilled. The temperature was then raised to 260° C. and held for 30 minutes. A vacuum of 1.0 to 2.0 mm. was applied for two hours while the stirring was continued. The product obtained has a strong tendency to crystallize. It melts at 240–250° C. when in the crystalline form. This polyester is especially valuable for the production of strong, elastic fibers by the melt spinning process. After drawing and heat treating, the fibers stick to the hot bar at 210–220° C. The polyester is also suitable for the manufacture of photographic film base.

*Example 4.—Diethylene glycol and tetramethylene glycol*

Three hundred and seventy-two g. (1.0 mol) p,p'-sulfonyl-dibenzoic acid diethyl ester, 106 g. (1.0 mol) diethylene glycol, and 72 g. (0.8 mol) tetramethylene glycol were placed in a reaction vessel as described in Example 1. A solution of 0.3 g. potassium aluminum ethoxide in ethyl alcohol was added as a catalyst. The mixture was heated according to the schedule described in Example 3, using a final temperature of 270–275°. The product obtained has an inherent viscosity of 0.80 in 60% phenol-40% tetrachlorethane. The polyester is especially valuable as a source of fibers. When melt spun and drafted, it gives fibers having a tensile strength of 3 to 4 grams per denier and 18–25% elongation. They have excellent elasticity and can be dyed readily with cellulose acetate dyes. The fibers stick on the hot bar at 220–230° C.

*Example 5.—Diethylene glycol and ethylene glycol*

Four hundred and twenty g. (1.0 mol) of p,p'-sulfonyldibenzoic acid dibutyl ester, 150 g. (1.4 mol) diethylene glycol, and 37 g. (0.6 mol) ethylene glycol were placed in a reaction vessel as described in Example 1. Magnesium turnings (0.2 g.) were activated by heating with iodine and were added to the reaction mixture. Stirring at 190–200° was continued until the evolution of butyl alcohol was substantially complete. The temperature was then raised to 260–270° C. and held for 1.5 hours. A vacuum of 2.0 to 3.0 mm. was applied for six hours. The polyester obtained shows a relatively wide softening range and tends to be non-crystalline. It is useful as a molding plastic. Fibers can also be prepared from this polyester.

*Example 6.—Triethylene glycol and ethylene glycol*

A polyester having the composition: 1.0 mol p,p'-sulfonyldibenzoic acid, 0.5 mol triethylene glycol, 0.5 mol ethylene glycol was prepared by exactly the same procedure described in Example 5 except that the glycol mixture employed in the reaction consisted of 1 mole of triethylene glycol and 1 mole of ethylene glycol. The polyester obtained is useful as a molding plastic; it has a relatively wide softening range and tends to be non-crystalline.

*Example 7.—Dimethylene glycol and ethylene glycol*

One hundred and sixty-seven and two-tenths grams of the butyl ester of p,p'-sulfonyl dibenzoic acid, 49.6 g. of ethylene glycol, and 41.2 g. of diethylene glycol were admixed with 0.5 cc. of a catalyst prepared by reacting 20 g. of Mg with 75 cc. of CH3I in 250 cc. of dibutyl ether. This mixture was heated with stirring under hydrogen at 195° for 2 hours, then at 280° for 1 hour, and finally under a vacuum of less than 1 mm. of mercury for 3 hours. The product was a light-colored, very tough polymer which could be spun to a fiber which could be cold-drawn 3–400 percent and which had an intrinsic viscosity in a 60–40 mixture of phenol-tetrachloroethane of 0.6. This polyester is also useful as a molding plastic.

*Example 8.—Diethylene glycol*

A catalyst was prepared by reacting 2 grams of magnesium with 9 g. of propyl chloride in 25 cc. dibutyl ether. Two-tenths of one cc. of this catalyst was added to a mixture of 41.8 g. of the butyl ester of p,p'-sulfonyl dibenzoic acid and 50 g. diethylene glycol. The mixture was heated under hydrogen with constant stirring at a temperature of 200° for 5 hours, and at 250° for 1 hour. It was then heated in a vacuum of 1 mm. of mercury for 5 hours. A polyester was produced which has an intrinsic viscosity in 60–40 phenol tetrachloroethane of 0.8. This product is useful as a molding resin and can be spun into fibers.

*Example 9.—Diethylene glycol and ethylene glycol*

The following ingredients were placed in a flask: 41.80 g. (1 mol) butyl diester of p,p'-sulfonyldibenzoic acid, 12.40 g. (2 mols) ethylene glycol and 16.96 g. (1.6 mol) of diethylene glycol. In this mixture the ratio by weight of these two glycols is 0.731 which represents a mixture of glycols containing about 44.5 mole per cent of diethylene glycol and about 55.5 mole per cent of ethylene glycol. In this mixture 0.08 g. of sodium metal was dissolved. The mixture was then heated under a nitrogen atmosphere at 180°–190° C. for 3 hours while butyl alcohol distilled off. The mixture was then heated at 280°–290° C. for 1 hour to distill off the excess glycols. The melt was then heated at 280°–290° C. under a reduced pressure of 0.05 mm. of Hg pressure for 6 to 8 hours. A hard tough resin was obtained that softened at 230°–240° C. It can be melted and spun to give strong fibers that cold-draw readily.

*Example 10.—Diethylene glycol and ethylene glycol*

The procedure of Example 9 was duplicated except that the ratio, by weight, of ethylene glycol to diethylene glycol was changed from 0.731 to 0.933 (without appreciably varying the total mol proportion of ethylene glycol and diethylene glycol employed). This represents a glycol mixture containing about 38.4 mole per cent of diethylene glycol and about 61.6 mole per cent of ethylene glycol. The result of this condensation was that a resinous product was obtained that softened at 260°–270° C.

Example 11.—Diethylene glycol

Three hundred and six grams (1.0 mol) of p,p'-sulfonyl dibenzoic acid and 318 grams (3.0 mol) of diethylene glycol were placed in a vessel as described in Example 1. This mixture was heated at 200–210° C. with stirring until the esterification had reached substantial completion. There was then added 0.3 gram of CaO as a catalyst and the mixture was stirred under an atmosphere of purified hydrogen at 200°–210° C. until the distillation of alcohol had substantially ceased. The temperature was then increased to 250° C. and held for one hour. A vacuum of 0.8–1.0 mm. of Hg pressure was applied, and heating and stirring under the inert atmosphere were continued for about 12 hours. The product obtained was essentially the same as that described in Example 1. Similar results can be obtained using as the catalyst: K, Ca, $Li_2CO_3$, $Na_2BO_3$, litharge, etc. Such catalysts can also be employed in the process described in the other examples given above after making suitable allowances for the differences in the reaction rates inherent in the change of the catalyst.

What I claim is:

1. A process for preparing a linear polyester which comprises (A) condensing a p,p'-sulfonyl dibenzoic diester having the formula:

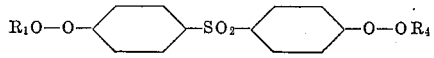

wherein $R_1$ and $R_4$ each represents a substituent selected from the group consisting of an omega-hydroxy alkyl radical containing from 3 to 12 carbon atoms and an alkyl radical containing from 1 to 6 carbon atoms, (B) with a dioxy compound consisting of from about 30 to 100 mole percent of an aliphatic ether glycol having the following formula:

$$R_5O-(R_7-O)_q-R_7-OR_6$$

wherein $R_7$ represents an alkylene radical containing from 2 to 4 carbon atoms, $q$ represents a positive integer of from 1 to 10, and $R_5$ and $R_6$ each represents a substituent selected from the group consisting of a hydrogen atom and an acyl radical containing from 2 to 4 carbon atoms, and from about 70 to 0 mole percent of a polymethylene glycol having the following formula:

$$R_5O-(CH_2)_p-OR_6$$

wherein $p$ represents a positive integer of from 2 to 12, the dioxy compound being employed at such a proportion that there is at least an equivalent amount of oxy substituents in proportion to the carboxy substituents in the overall combination of the diester and the dioxy compounds, (C) in the presence of a condensing agent selected from the group consisting of the alkali metals, the alkaline earth metals, the oxides of these two groups of metals, the alkoxides containing from 1 to 8 carbon atoms of these two groups of metals, the carbonates and borates of these two groups of metals, and litharge, (D) at an elevated temperature, (E) the condensation being conducted in an inert atmosphere, and (F) the latter part of the condensation being conducted at a very low pressure of the inert atmosphere.

2. A process as defined in claim 1 wherein the elevated temperature is increased gradually during the course of the condensation up to a temperature of from about 225° to about 310° C.

3. A process as defined in claim 2 wherein the condensing agent is employed in an amount of from about 0.005% to about 0.2% based on the weight of the sulfonyl dibenzoic diester employed.

4. A process as defined in claim 3 wherein the dioxy compound is employed in such a proportion that there are from about 1.2 to about 3 oxy substituents in proportion to the carboxy substituents in the overall combination of the diesters and the dioxy compound.

5. A process as defined in claim 4 wherein the elevated temperature employed during the earlier part of the condensation is from about 150° to about 220° C. and the low pressure defined under (F) is less than about 15 mm. of Hg. pressure.

6. A process as defined in claim 5 wherein all materials employed in the process are substantially anhydrous.

7. A process as defined in claim 6 wherein the major proportion of dioxy compound is made up of a compound having the formula:

$$HO-(R_7-O)_q-R_7-OH$$

wherein $R_7$ and $q$ are defined under (B).

8. A process as defined in claim 7 wherein the dihydroxy compound is diethylene glycol.

9. A process as defined in claim 7 wherein the dihydroxy compound is bis (4-hydroxybutyl) ether.

10. A process as defined in claim 7 wherein the dihydroxy compound is composed of an equimolecular mixture of diethylene glycol and pentamethylene glycol.

11. A process as defined in claim 7 wherein the dihydroxy compound is composed of about 55.5 mole percent of diethylene glycol and about 44.5 mole percent of tetramethylene glycol.

12. A process as defined in claim 7 wherein the dihydroxy compound is composed of 70 mole percent of diethylene glycol and 30 mole percent of ethylene glycol.

13. A process as defined in claim 1 wherein the sulfonyl dibenzoic diester is formed by a preliminary step comprising condensing p,p'-sulfonyl dibenzoic acid with a dioxy compound which is defined under (B), at an elevated temperature, after which preliminary step the condensing agent which is defined under (C) is added and the condensation is completed as defined under (D), (E) and (F).

14. A process as defined in claim 13 wherein the preliminary elevated temperature is substantially that at which reflux conditions subsist, the subsequent condensation being conducted at a temperature which is gradually increased during the course of the condensation up to about 280°–310° C., and the dioxy compound is employed in such a proportion that there are from about 1.2 to about 3 oxy substituents in proportion to the carboxy and carbalkoxy substituents in the overall combination of the diacids, diesters and dioxy compounds.

15. A linear polyester which melts or softens below its decomposition temperature and which melts or softens at a temperature of at least 160° C. and contains the following repeating units:

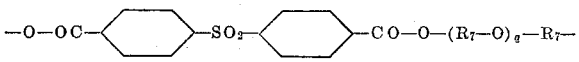

wherein $R_7$ represents an alkylene radical containing from 2 to 4 carbon atoms and $q$ represents a positive integer of from 1 to 10, which polyester is capable of being readily formed into shaped objects within its softening temperature range, which have excellent dimensional stability and low water absorption characteristics.

16. A linear polyester as defined in claim 15 wherein $R_7$ represents an ethylene radical and $q$ is 1 containing the following repeating unit:

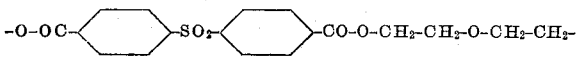

17. A linear polyester as defined in claim 15 wherein $R_7$ represents a tetramethylene radical and $q$ is 1.

18. A linear polyester as defined in claim 15 which contains repeating units in the polyester configuration in a proportion of from 30 to 100 mole per cent of one of those defined in claim 15 and from 0 to 70 mole per cent of the following repeating units:

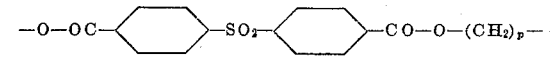

wherein $p$ represents a positive integer of from 2 to 12.

19. A linear polyester which contains repeating units in the polyester configuration in a proportion of from 30 to 70 mole per cent of the following repeating unit:

and conversely from 70 to 30 mole per cent of the following repeating units:

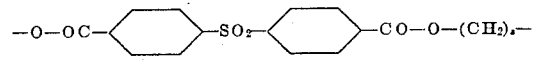

wherein $s$ represents a positive integer of from 2 to 8, which polyester is capable of being spun into fibers which can be drawn to from 3 to 6 times their originally spun length whereby these fibers develop strong, elastic and highly valuable properties.

References Cited in the file of this patent
UNITED STATES PATENTS

| | | |
|---|---|---|
| 2,437,046 | Rothrock et al. | Mar. 2, 1948 |
| 2,465,319 | Winfield et al. | Mar. 22, 1949 |
| 2,547,113 | Drewitt et al. | Apr. 3, 1951 |
| 2,643,989 | Auspos et al. | June 30, 1953 |

FOREIGN PATENTS

| | | |
|---|---|---|
| 621,977 | Great Britain | Apr. 25, 1949 |